(12) United States Patent
Haverkate et al.

(10) Patent No.: US 10,818,927 B2
(45) Date of Patent: Oct. 27, 2020

(54) LITHIUM BATTERY CURRENT COLLECTOR COMPRISING CONDUCTIVE PILLARED STRUCTURES ON A SUBSTRATE

(71) Applicant: Nederlandse Organisatie voor toegepast-natuurwetenschappelijk onderzoek TNO, 's-Gravenhage (NL)

(72) Inventors: Lucas Augustinus Haverkate, 's-Gravenhage (NL); Sandeep Unnikrishnan, 's-Gravenhage (NL); Dorothee Christine Hermes, 's-Gravenhage (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 132 days.

(21) Appl. No.: 16/062,345

(22) PCT Filed: Dec. 15, 2016

(86) PCT No.: PCT/NL2016/050877
§ 371 (c)(1),
(2) Date: Jun. 14, 2018

(87) PCT Pub. No.: WO2017/105234
PCT Pub. Date: Jun. 22, 2017

(65) Prior Publication Data
US 2018/0375100 A1    Dec. 27, 2018

(30) Foreign Application Priority Data

Dec. 16, 2015 (EP) .................................... 15200434

(51) Int. Cl.
*H01M 4/62* (2006.01)
*H01M 4/70* (2006.01)
(Continued)

(52) U.S. Cl.
CPC ............. *H01M 4/624* (2013.01); *H01M 4/04* (2013.01); *H01M 4/139* (2013.01); *H01M 4/661* (2013.01);
(Continued)

(58) Field of Classification Search
None
See application file for complete search history.

(56) References Cited

U.S. PATENT DOCUMENTS

2009/0214956 A1* 8/2009 Prieto ................. H01M 4/0404
429/310

FOREIGN PATENT DOCUMENTS

| EP | 2849265 A2 | 3/2015 |
| WO | 2010032159 A1 | 3/2010 |

OTHER PUBLICATIONS

International Search Report and Written Opinion dated Mar. 6, 2017 in PCT Application No. PCT/NL2016/050877.
(Continued)

*Primary Examiner* — Wojciech Haske
(74) *Attorney, Agent, or Firm* — McDermott Will & Emery LLP

(57) ABSTRACT

A method of manufacturing a Lithium battery with a substrate current collector formed of pillars on a substrate face, wherein the method comprises: forming elongate and aligned structures forming electrically conductive pillars on the substrate face with upstanding pillar walls; wherein the pillars are formed with a first electrode, a solid state electrolyte layer provided on the first electrode; and a second electrode layer, wherein the pillars are dimensioned in such a way that adjacent pillars are merged and a topstrate current collector is formed of complementary interspace structures between the merged pillars.

6 Claims, 8 Drawing Sheets

(51) Int. Cl.
*H01M 10/0562* (2010.01)
*H01M 4/04* (2006.01)
*H01M 4/66* (2006.01)
*H01M 10/052* (2010.01)
*H01M 10/0585* (2010.01)
*H01M 4/139* (2010.01)

(52) U.S. Cl.
CPC ........... *H01M 4/70* (2013.01); *H01M 10/052* (2013.01); *H01M 10/0562* (2013.01); *H01M 10/0585* (2013.01)

(56) References Cited

OTHER PUBLICATIONS

Gowda, Sanketh R., "Three Dimensional Nanostructured Designs for Lithium Ion Batteries" PhD dissertation, Rice University, Houston, Texas, Feb. 2012.
Roberts, Matthew, et al., "3D lithium ion batteries—from fundamentals to fabrication" Journal of Materials Chemistry vol. 21, No. 27, pp. 9876-9890, 2011.

\* cited by examiner

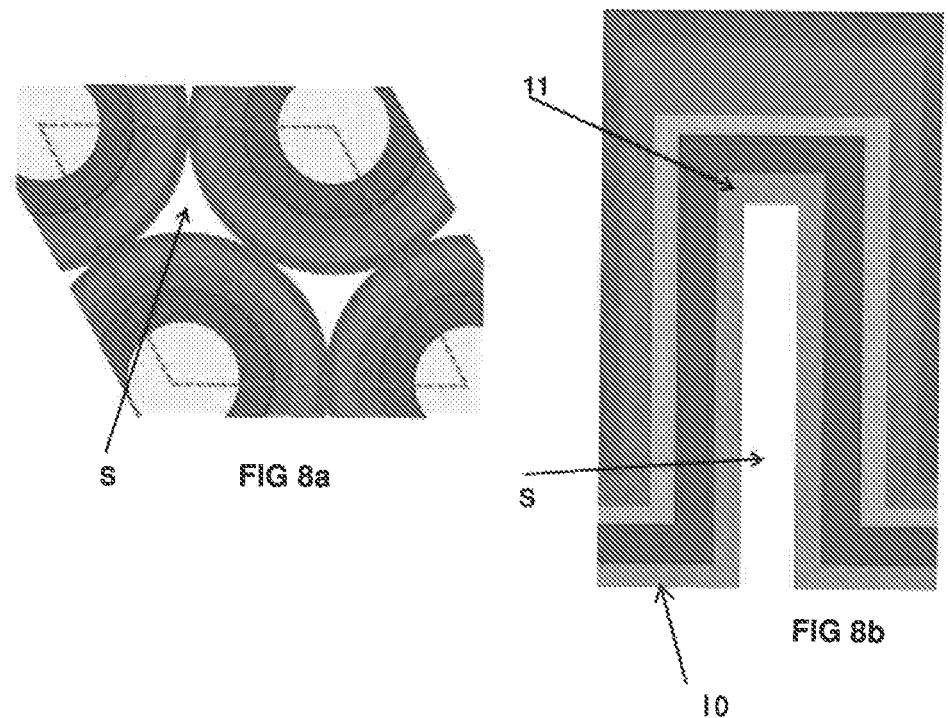
FIG 8a
FIG 8b
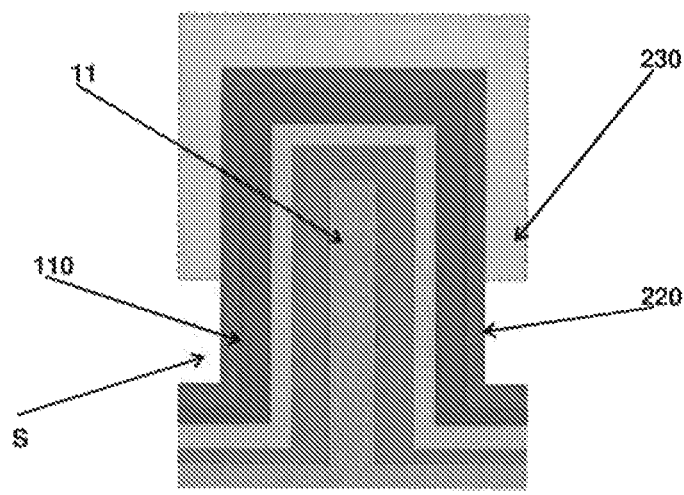
FIG 9

Step 1

Step 2

Step 3

LITHIUM BATTERY CURRENT COLLECTOR COMPRISING CONDUCTIVE PILLARED STRUCTURES ON A SUBSTRATE

RELATED APPLICATIONS

This application is a United States National Phase under 35 U.S.C. § 371 of International Application No. PCT/NL2016/050877, filed on Dec. 15, 2016, which claims priority to European Patent Application No. 15200434.7, filed on Dec. 16, 2015, both of which are hereby incorporated by reference in their entirety for all purposes.

FIELD

The present invention relates to a method of manufacturing a Lithium battery for electrochemical or electro-optical devices.

BACKGROUND

In vehicle applications e.g. for use in a hybrid electric vehicle (HEV), a battery storage system is responsible for supplying pulsed power (high currents) e.g. to enable the start-stop function of a micro-HEV or acceleration of an HEV. The battery storage can also recuperate the braking (kinetic) energy in a matter of seconds (up to 15 seconds) and store this recovered energy. This function is referred to as regenerative braking.

Conventional lead-acid battery packs are conventionally uncapable of capturing the braking energy due to a limited charge uptake. Therefore many-battery systems exist where next to the lead acid battery, one or more auxiliary batteries are introduced.

In electronic devices of the present type a rechargeable Li-ion solid-state battery has current collector of non-planar design. Thin-film battery structures of known type are disclosed e.g. in WO2010032159, the contents of which are included by reference, wherein for example all-solid state compositions are deposited on 3D micro-patterned structures. In this respect, where early battery structures utilize liquid electrolytes, all-solid state compositions utilize electrolytes of a solid state type, which are inherently safer in use. In these structures a large variety of materials are and have been used for the respective electrodes for example as disclosed in US 20110117417. In discharging battery mode, the anode is the "negative electrode" to which the positive current flows, from the cathode, being the "positive electrode". During charge these functions are reversed. Irrespective charging mode, the electrochemical relationship may be characterized by charge exchange between a negative electrode material and a positive electrode material, the negative electrode material having a workfunction or redox potential that is lower than the workfunction or redox potential of the positive electrode material.

For example, known negative electrode (anode) materials are $Li_4Ti_5O_{12}$ (LTO); $LiC_6$ (Graphite); $Li_{4.4}Si$ (Silicon) and $Li_{4.4}Ge$ (Germanium) known positive electrode (cathode) materials are $LiCOO_2$ (LCO), $LiCoPO_4$, (doped) $LiMn_2O_4$ (LMO), $LiMnPO_4$, $LiFePO_4$ (LFP), $LiFePO_4F$ (LFPF) or $LiCO_{1/3}Ni_{1/3}Mn_{1/3}O_2$ (LCNMO).

Known (solid state) electrolytes might include lithium iodide (LiI), lithium phosphate ($Li_3PO_4$) and lithium phosphorus oxynitride (LiPON). In addition, lithium salts, such as $LiPF_6$, $LiBF_4$ or $LiClO_4$ in an organic solvent, such as ethylene carbonate, dimethyl carbonate, diethyl carbonate, propylene carbonate are known to have a typical conductivity of about 10 mS/cm at RT. The electrolyte decomposes on initial charging and forms a solid layer called the solid electrolyte interphase (SEI).

Solid polymer separators may also be included, such polymers having transport capacity often due to having a lithium salt disposed therein as known in the state of the art. Work has also been performed with lithium and halide materials, particularly, in some examples, a lithium aluminum tetrahalide such as lithium aluminum tetrafluoride ($LiAlF_4$).

Once such structures are made on a bendable metal foil, they can be manufactured in large-scale processes, e.g. a roll-to-roll process where the following can be done: 1) Coiling, winding or stacking it to increase the energy or power density per unit volume. 2) Integrating it on flexible devices like flexible displays, signage etc.

EP2849265 shows a battery formed by conducting nanowires conformally coated with electrolyte material. Cathode material in electrical connection with a second conductive material is interpenetrated between the electrolyte-coated nanowires.

WO2010032159 shows a trench structure with a cathode layer formed on top of the barrier layer. Thereon a solid state electrolyte is deposited.

Although high-aspect ratio structures can be made in nanometer scale the height or depth of these high-aspect ratio structures need to be in the microns range for delivering enough charge capacity for the battery. The reason why these structures are preferred is due to the easy accessibility of their entire surface. In the prior art many methods to produce these are non-economical (e.g. involving silicon microfabrication and long-time electrodeposition). Moreover, to do any of these, the design of the stack is in need for optimization because otherwise while winding or flexing, the pillar structure could be damaged inhibiting proper electrochemical action of the device. Furthermore, it has come to the attention that existing solid state Li-based intercalation electrolytes induce stress in the high-aspect ratio structures that may limit lifetime and reduce the number of cycle periods. Accordingly, it is sought to provide a high-aspect ration structure wherein the effective weight is reduced. A challenge exists to minimize the relative amount of electrochemically inactive electronic current collectors without compromising on the rate performance.

SUMMARY OF THE INVENTION

It is an object of the invention to provide a method for producing an electronic device having a current collector capable of a high specific charge collecting area and power, having a proper dimensioning but is also achieved using a simple and fast technique and resulting in a robust design.

To this end, according to an aspect a method of manufacturing a Lithium battery with a substrate current collector formed of pillars on a substrate face, wherein the method comprises: forming elongate and aligned structures forming electrically conductive pillars on the substrate face with upstanding pillar walls; wherein the pillars are formed with a first electrode, a solid state electrolyte layer provided on the first electrode; and a second electrode layer, wherein the pillars are dimensioned in such a way that adjacent pillars are merged and a topstrate current collector is formed of complementary interspace structures between the merged pillars.

The pillars function as current collectors for the battery structure in a laminate, which current collectors are electrically connected through a base substrate. Between adjacent pillars, an aspect ratio of a height dimension and the pillar interdistance, i.e. a length dimension normal to the walls coplanar along the base, is relatively high, that is, higher than 50, or even higher than 80 or even more than 100. In a typical arrangement, the pillars may have height dimensions, i.e. a height separating a base plane from a planar surface of about 25-200 micrometer, preferably 50-100 micrometer wherein the length dimensions, i.e. the length separating opposing pillars, and can be in the order of 1-10 micrometer, preferably 2-4 micrometer. For such structures, the substrate as presently disclosed is electrically conductive with a surface area of the current collector that is significantly increased, which enhances the charge collecting capacity of the current collector. Moreover, for such structures, it is possible to apply a conformal multilayer coating without compromising the functionality of the multilayer coating. Examples of such functionality may be multilayers such as a battery multilayer or photovoltaic multilayer or single layer coatings.

In addition, according to an aspect of the invention, for such high-aspect ratio structures optimal current collecting performance may be provided in the form of a coated pillar wherein the high-aspect ratio structure comprises metal or metalized pillars having a radius of curvature larger than 50 nanometer. An aspect of improved performance is a trade-off that is found by a density of the high-aspect ratio structure demanding smaller pitches and the surrounding conformal coating. In this respect, electrode thicknesses in the battery multilayer may be varied and are correlated to match their volumetric storage capacities for Lithium-ions while charging and/or discharging. A known matching relationship is governed by a C-rate number, known in the art. A C-rate is a measure of the rate at which a battery is charged or discharged relative to its maximum capacity. For example the capacity of the electrode layers at a certain C-rate are matched by controlling layer thickness and material composition.

Another aspect of the invention is that a 'conformal coating' is a coating that may comprise a plurality of layers that at least conformally coat the pillars of the high aspect ratio structure. Furthermore, in this application, a 'first electrode' may be part of a laminate and may be the a bottom layer, i.e. the layer with the smallest radius of curvature. The 'second electrode' may be used to indicate a top layer of a laminate, i.e. the layer with the highest radius of curvature. It is noted that a laminate is not essential, since the electrode structures may be merged into the collector structures as porous complex structures. In such embodiments, an electrolyte layer is provided between electrode structures that are combined with current collector structures.

It is noted that in US2009214956 a structure is proposed wherein electrolyte material, is conformally coated onto conducting nanowires and wherein cathode material, in electrical connection with a second conductive material, is interpenetrated between electrolyte-coated nanowires.

With thickness is meant 'average thickness' which may render an equivalent function of a certain mathematical thickness. In the application, where layers are coated, it is intended that these coatings at their functional locations are substantially conformal, but this is not necessary, as long as a functional layer is designed to have a thickness where a tradeoff is reached between internal resistance, and energy density. In the specification, depending on context, functional layers may not be in direct contact with other functional structures, but may have intermediate layers or structures in between that may enhance functionality. In that respect, the skilled person will understand that where it is described, for example, that the negative electrode layer is 'a bottom layer', 'in contact' with a charge collector, such would be interpreted as 'in electrical contact' not excluding a possible Lithium diffusion barrier layer, current collecting layer, process protection layer etc. enhancing functionality. This similarly counts for electrolyte layers 'in contact' with the negative electrode and positive electrode layers.

These and other aspects of the invention will be discussed in more detail with reference to drawings, wherein like reference numerals refer to like elements. It will be appreciated that the drawings are presented for illustrative purposes and may not be used for limiting the scope of the appended claims.

BRIEF DESCRIPTION OF THE DRAWINGS

FIGS. 8 and 9 shows further embodiments of a hollow current collector structure;

DETAILED DESCRIPTION OF THE DRAWINGS

In the following examples in more detail aspects of the invention will be illustrated in the form of an electrochemical device, more specifically a battery device, for instance of a lithium ion type, more specifically having a 3D collector structure for enhancing the charge collecting specific area of the collector, that is in electrical contact with battery multilayer, in particular, a negative electrode layer thereof.

Figure 1A:
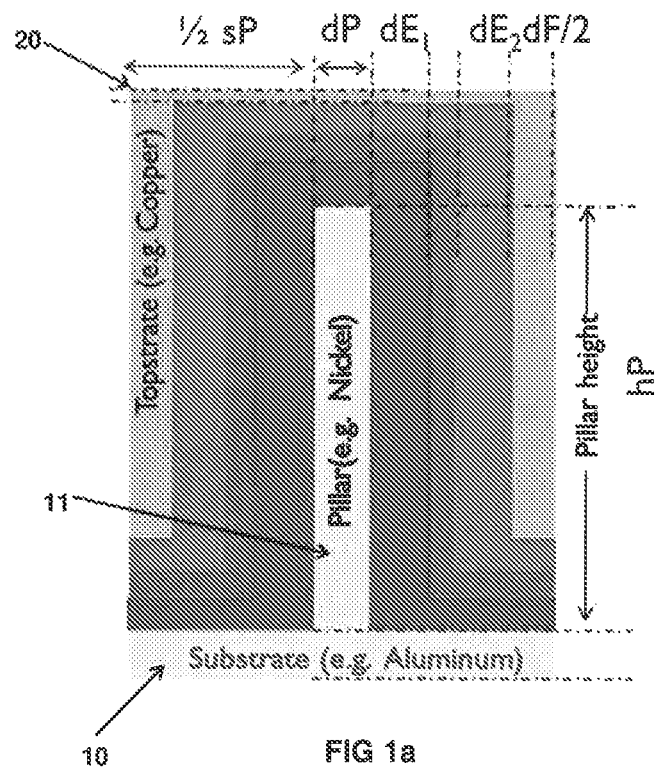
FIG. 1A shows a geometric structure of an embodiment in cross sectional view.

FIG. 1a shows a geometric structure of an embodiment in cross sectional view where electrically conductive pillars 11 are formed on the substrate face 10. A general challenge for batteries is to minimize the relative amount of electrochemically inactive electronic current collectors (CC) without compromising on the rate performance. The 3D structured bottom CC—e.g. pillars or plates/trenches—imposes a relative large amount of inactive material in terms of volume and weight, as their dimensions (aspect ratios) are bound by technical limitations. In addition, for 2D-confined structures such as pillars a too small radius can force the bottom electrode to approach non-favorable dimensions, i.e. a too thick layer with limited diffusion. Moreover, fabrication of very thin and high aspect ratio pillars is a processing challenge. The final spacing between pillars (after depositing 3DTFB stack) is typically filled with the top current collector. Due to the unfavorable spacing of the layer because of design limitations, the top current collector takes a relatively large amount in volume & weight of the pillared 3DTFB.

Figure 1B:
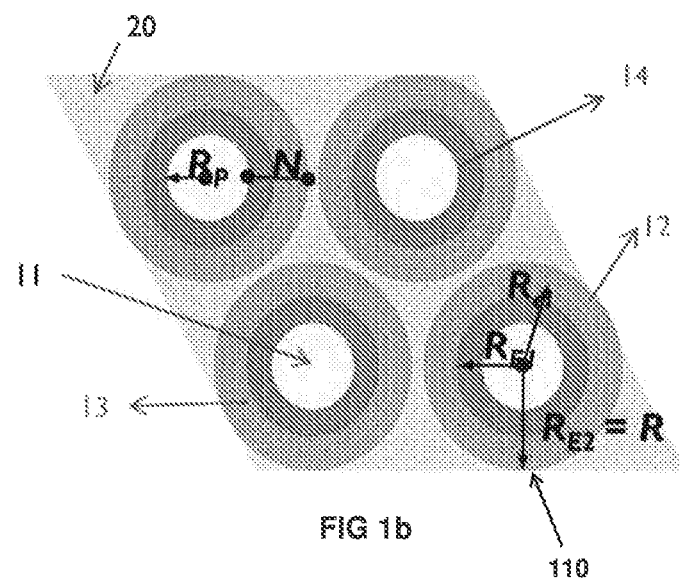
FIG. 1B the structure of FIG. 1A in planar view.

FIG. 1B shows the structure of FIG. 1A in planar view. In the figure, a single pillar 11 is shown as part of a structure of many pillars having an interdistance sP, e.g. with an interdistance sP between the pillar walls that ranges between 500-2500 nm.

The electronic device 100 comprises electronic circuitry (not depicted) equipped with a current collector 10 formed by a metal substrate having a face forming a high-aspect ratio structure of pillars 11. The walls have for example, an aspect ratio larger than 10 or even larger than 50. The pillars can e.g. be formed by a micropattern mask, so that isolated micro pillars are formed. In the specification, the term pillars or micropillars is used to distinguish from 'dense' nanopillar structures. Such dense structures, in contrast may have elongate tubes having diameter dimensions smaller than 300, or even smaller than 50 or 10 nm and with interdistances d smaller than about several hundreds nm, e.g. in the range of 50-300 nm, which are too densely packed without sufficient gap for conformally coating multilayer stacks on them.

The micropillar structure may have pillar heights hP of more than 100 nm or even more than 1 micrometer, arbitrary elongate shapes and diameters dP at least larger than the said 10 nm, typically more than 100 nm and in this respect typically qualify as high aspect ratio structures. Herebelow, a pillar radius is therefor 0.5 dP.

In its simplest conceptualization, the battery device 100 comprises two current collectors 10, 20, one that supplies electrons by virtue of an oxidation process occurring at an electrode layer, in the example termed the anode 12, and a second one that consumes electrons by virtue of a reduction process occurring at that electrode, termed the cathode 14. In discharging battery mode, the anode 12 is the "negative electrode" to which the positive current flows, from the cathode, being the "positive electrode". During charge these functions are reversed. Irrespective of charging mode, the electrochemical relationship may be characterized by charge exchange between a negative electrode material and a positive electrode material, the negative electrode material having a workfunction or redox potential that is lower than the workfunction or redox potential of the positive electrode material.

Thin film ion batteries, including those of the thin film solid state lithium ion type, can be prepared from various deposition techniques to fabricate negative electrode 12 (e.g. LMNO), positive electrode 14 (e.g. LTO), and electrolyte materials 13 (e.g. LIPON) bonded together to form a battery device. Such techniques may typically include depositing thin films of such materials using vacuum deposition or other techniques that result in similar thin films, to produce the "thin film" batteries. A maximum conformal diffusion path in lateral direction is therefore given as the sum of the layer thicknesses of first electrode dE1, electrolyte e1, and second electrode dE2, giving rise to conformally coated pillar 110 with a radius R. Final interpillar distance dF will be the interpillar distance sP minus the lateral diffusion path length N. In the Figures, a difference is marked between a coated pillar 110, and a 'bare' pillar 11, that forms the primary structure on a planar surface 10.

Thin film batteries are often employed in applications in which space and weight may preferably be conserved and extremely long cycle life may be desired. The topstrate current collector 20 could be any organic or inorganic material. It can for example have some other extra functionality such as a current collector and may optionally, be electroplated over the pillars after the active layers of the battery stack are deposited. Also, the current collector can be used as a planarizing topstrate that planarizes the high-aspect ratio structure.

Figure 2:
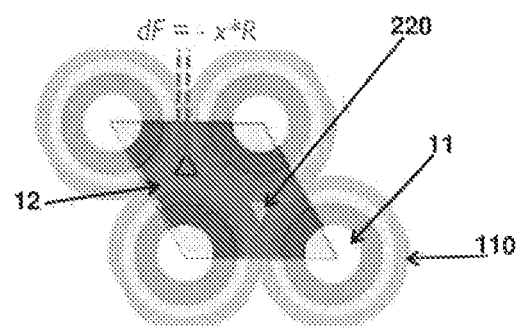
FIG. 2 shows an embodiment in planar view according to an aspect of the invention.

In more detail, FIG. 2 shows an embodiment according to the invention, wherein the pillars 110 are dimensioned in such a way that adjacent pillars 110 are merged and a topstrate current collector 220 is formed in complementary interspace regions S1 between the merged pillars 110. In FIG. 2, it is shown that the final interpillar distance dF is zero or negative i.e. an overlap region O1 is present of one or more of the coated layers 12 in such a way that some of the layers 12 are shared. In particular, the topstrate interpillar structure S1 is no longer conformal, but may be formed in compartments 220 extending in height along adjacent pillars 110. In addition, the second electrode layer 12 may be shared in an overlap region O1 between adjacent pillars 110.

Figure 3:
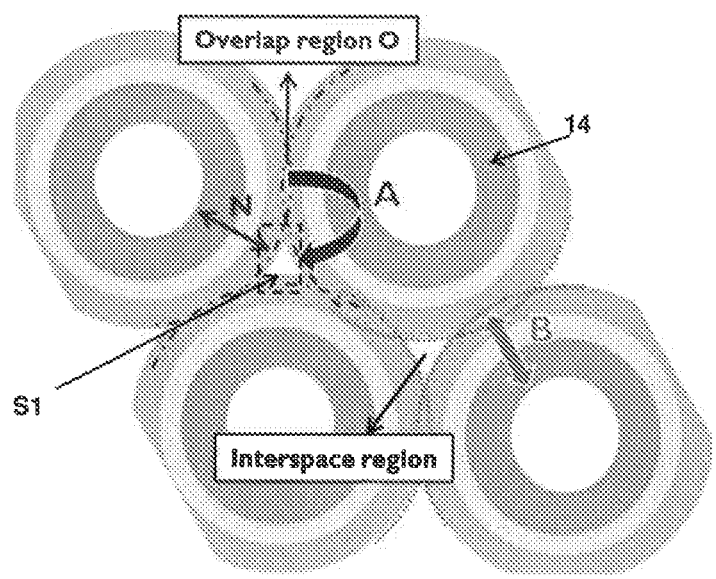
FIG. 3 shows a further embodiment in planar view according to an aspect of the invention.

In FIG. 3 it is shown that in this interspace region S1, additional electrode material may be deposited, in order to compensate for the overlap. Thus, in effect, the mass balance between the layers can effectively be restored to prevent a mass imbalance with respect to with the first electrode 14. In order to calculate a mass imbalance correction the top electrode layer 14 may be extended into the interspace region S1 (shown by the purple arrow A). In this method, i.e. to extend the top electrode layer 14 into the interspace region O2, the maximal lateral diffusion path is minimally varied with respect to a given N being a given optimal size of a maximal diffusion path in a straight-line of a conformal layer, in lateral direction for a given stack chemistry, cell geometry and application.

For example for an optimized stack of 800 nm first electrode 12 of LMNO a 500 nm electrolyte material 13 of LIPON and a 400 nm second electrode material of LTO N equals 1.7 um. Alternatively the first electrode 14 is varied to compensate any top electrode overlap dF (orange arrow B). Both approaches can lead to the same final structure, but differ in the definition of N, the length of the maximal lateral diffusion path in the conformal case.

Figure 4:
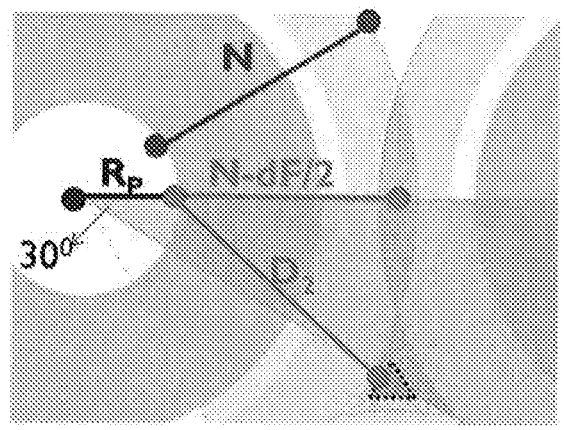
FIGS. 4 and 5 show a corresponding diffusion path analysis for embodiments according to the invention.

FIG. 4 shows a diffusion path analysis in respect to an interpillar distance overlap expressed as a ration of coated pillar 110, i.e. in terms of dF/R. Due to non-conformal electrode distribution, part of the ions must travel a lateral distance larger than the maximum conformal diffusion length N. Consider the maximal straight-line lateral diffusion path D2 at a given degree of merging is defined in the upper Figure. An increase of D2 to about 125% of N is tolerable without considerable rate performance loss.

Figure 5:
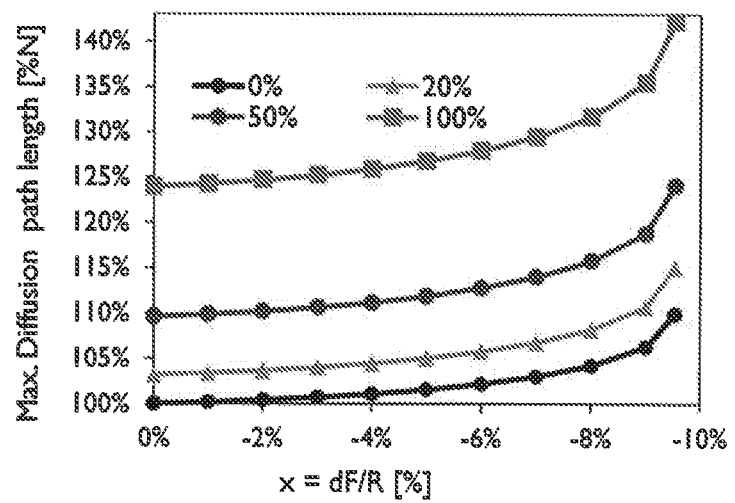

As shown in FIG. 5, it can be calculated that a window for negative interpillar distance where a diffusion path length is acceptable can be expressed in a window of maximum 6-8% overlap relative to the pillar radius. This is a trade off wherein an optimal electronic/ionic conduction and energy density can reached for final interpillar spacings dF between −8% and +6% of the top electrode radius R.

This can be explained since more than 92% of the ions are still within the conventional range, i.e. with diffusion lengths smaller than N.

The geometry dictates that the amount of ions with maximum path lengths at a certain merging is relatively small, i.e. the outermost surface decreases with increased merging.

The overall rate performance is also dependent on the interfacial resistances (charge transfer) which remain similar in the merged case. So the increase in diffusion path from the optimized conformal case has a relative smaller effect on the rate performance.

Result: For a given RP, D2 increases strongly by going from dF/R=−8% to maximum merging, while the gain in interpillar area usage is only about 1.6%.

Figure 6:
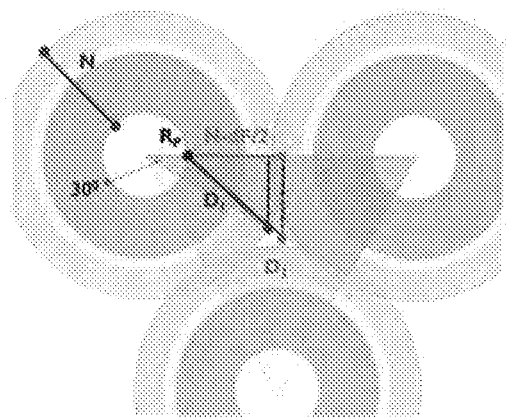
FIGS. 6 and 7 shows a performance analysis in relation to a pillar diameter.
Figure 7:
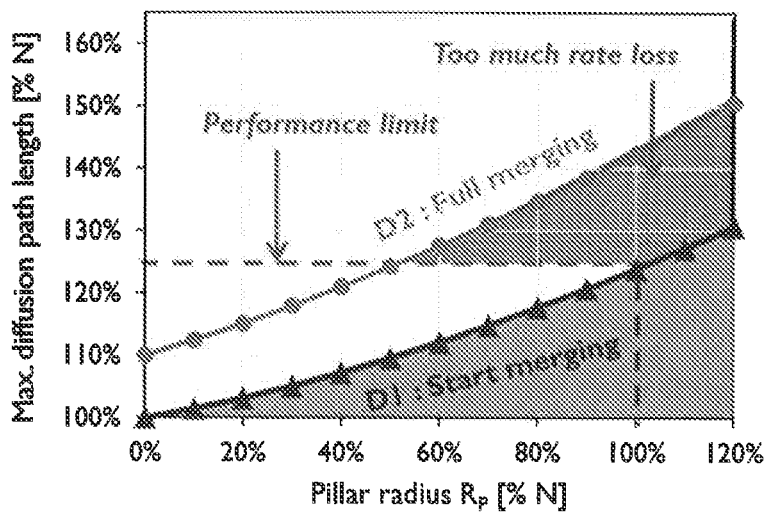

FIGS. 6 and 7 provides an analysis as to rate performance, that depends on a maximum diffusion path in respect to a diameter D1 which is the maximum diffusion length at the start of merging, i.e. when dF/R goes to values smaller than zero. D2 is taken at full merging. Due to non-conformal electrode distribution, 0% to max 9.3% of the ions must travel a lateral distance in the approximate range of D1 to D2 depending on degree of merging. As a result the effect of merging on rate performance is strongly dependent on the pillar radius R. For pillar radii R larger than N all ions in the excess region must travel a distance of at least 125% N, which can be considered a performance limit. It is noted that in an extreme case of merging the collector material may be eliminated, if the top (second) electrode material 12 has sufficient electronic conductivity. For example, in one of the embodiments a 2.5 D geometry can be provided, e.g. where the bottom (first) electrode and electrolyte are conformally coated thin-films on a pillared current collector 11 and the top electrode 20 is formed as a composite (consisting of activate material and electronic as well as ionic conductors). As an example, the composite top electrode could be formed by a porous metal scaffold having solid electrolyte and active material within it. Furthermore, it is noted that a circular pillar cross-section is preferred due to conformality of the diffusion path; homogenous electrical performance over the battery foil and less intercalation stress-points that may leads to break down. However this does not exclude other cross-sections likes e.g. ellipse, polygonal shapes, beam like or arbitrary shapes. The pillar cross-section choice is not only limited by a conformal deposition technique to have a homogenous diffusion length, but also by residual final interpillar distance between the pillars after touching.

FIG. 8 shows a further embodiment of a hollow bottom current collector structure 110 in planar view (FIG. 8a) and in cross sectional view (FIG. 8b). Similarly, FIG. 9 shows a hollow top collector structure 230, that may expands on a conformal collector layer 220 at least along a cross section of the pillar 110. In the various geometries, empty spaces S are provided, that reduce the amount of weight. For example, to reduce the relative weight contribution of the top current collector 220 the interspace structure may be kept partly empty, e.g. by depositing only a thin film layer 220 of top current collector on a top electrode 12 e.g. a metal or alloy layer, e.g. Ni, Cu, TiN of layer thicknesses: 1-500 nm. This thin film layer 220 may be partially coated by a further conductive capping 230, e.g. of a light weight conducting material, for example a conducive polymer. Such a light weight current collector 230 can also be extended to form a thicker topstrate region for electron transport along the battery foil. This capping 230 may be only formed by partially filling the interspaces, so that only a top part of the remaining interspace region is filled with the light weight conducting material. A thickness of the capping 230 layer can be typically 0-20 nm, so next to electron transfer it acts as a small protective layer. E.g. preventing oxidation for less stable light weight materials.

Figure 10:
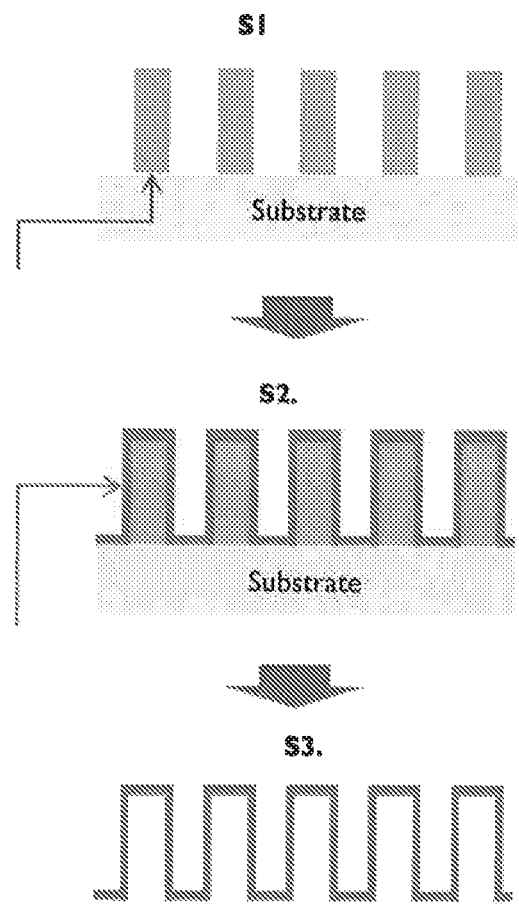
FIG. 10 shows an exemplary process step for obtaining a hollow current collector structure.

FIG. 10 shows an exemplary process for manufacturing a hollow structure, e.g. of the type as in FIG. 8. E.g. to provide a hollow pillar structure a removable substrate may be used with sacrificial pillars. In a First process step S1 a template substrate is prepared with sacrificial pillars. This substrate can be for instance an aluminum or copper or silicon substrate. Pillars can be for instance made of a photoresist material, an aluminum oxide (AAO) layer, or a carbon nanotube/wire layer CNT/CNWs. These structures may be provided by a combination of process steps known to the skilled person. For example, in a first step S1, a pillar structure 100 is provided, e.g. by a templating process, wherein pillars are grown templates that can be lithographically provided, for instance, in an AlO2 substrate, wherein holes are back etched, and pillars are formed by a plating step. Alternatively, the pillar structure may be provided by conductive nanotubes, e.g. carbon nano tubes or the like.

In a second process step S2 a current collector layer is deposited. e.g. Ni or Cu deposited by electroless plating or electroplating. Preferably, a 300 nm thickness of the deposited layer is provided to ensure that the structure is stiff enough even for high aspect ratio pillars (Ø>2 μm and >60 μm high). The base of the hollow pillars (i.e. the non-structured flat area) can be made thicker (~5 μm) for handling.

Next, in a third process step, S3 the sacrificial substrate & pillars are removed, e.g. by conventional etching steps, so that the hollow current collector structure remains.

In a further aspect, a 2.5 D geometry can be provided, e.g. where an electrode and current collector are formed as a composite (consisting of activate material and electronic as well as ionic conductors). As an example, the composite electrode could be formed by a porous metal scaffold having solid electrolyte and active material within it. A porous scaffold can e.g. be provided by co depositing Cu Ni and leaching the Ni part.

Figure 11:
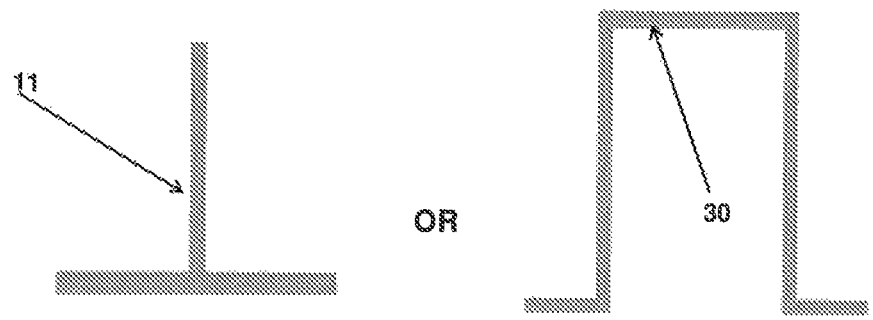
FIG. 11 shows an exemplary process steps for manufacturing a high aspect ratio structure according to an aspect of the invention.
Figure 11:
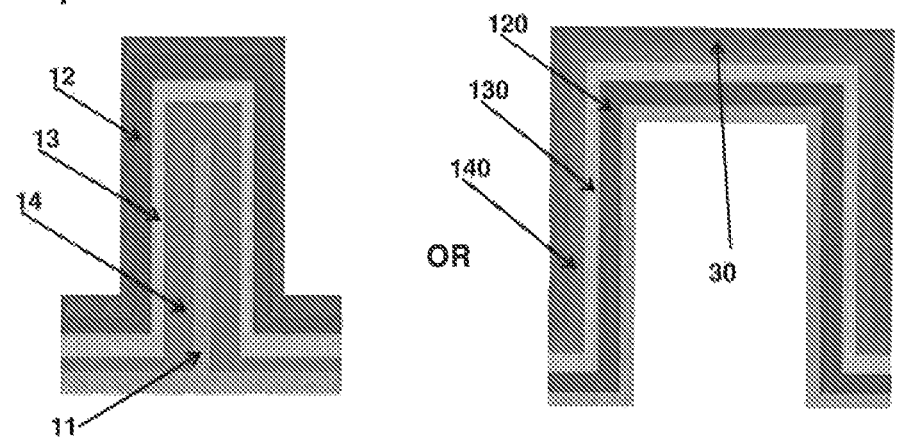
Figure 11:
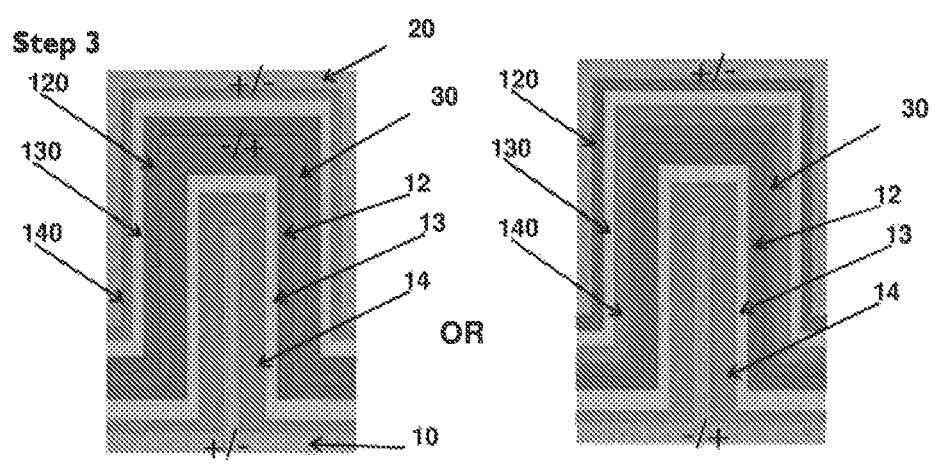

FIG. 11 shows a further illustration of hollow structures in stacked form, preferably wherein a base pillar structure 11, 30 is provided in a first step. An electrolyte layer 13, 130 covers the base pillar structure, in particular a first electrode 14, 140 in a second step.

An intermediate current collector 30 is thus formed as a hollow pillar structure conformally covering the base pillar structure 11; wherein the intermediate current collector 30 is further covered with a second electrolyte 130 and a topstrate current collector 20 covering the second electrolyte 130. E.g. starting from an intermediate current collector structure 30, both sides may be conformally coated with electrode layers anodes 12, 120, cathodes 14, 140 and electrolyte layers 13, 130. It is noted that the order of electrodes (anode 12 vs cathode 14) is preferably reversed to get a parallel stack. Here, the collector 30 has a reverse polarity.

For a series stack, an extra layer of top CC can be deposited on the top/bottom of the hollow pillar CC structure to account for degradation mechanisms like oxidation. In the process, layer thicknesses of the two coatings opposite intermediate collector 30 are adjusted in such a way that an optimal trade-off between capacity and rate performance match is reached between the two layers. Practical thicknesses of the electrode layers vary between 100-3000 nm.

Alternatively, starting from a pillar structure 11 a conformal coating of electrode layers 12, 14 and electrolyte 13 may be provided. Similarly, the intermediate structure is formed by depositing of a thin conductive layer. The order of electrode (anode 12 vs cathode 14) is reversed to get a parallel stack with topstrate 20 and substrate 10 as a first terminals and intermediate collector as a second terminal with reversed polarity. For a series stack, an extra barrier layer of top CC (e.g. TiN, Ni) can be deposited on the top/bottom of the thin-layer top CC to account for degradation mechanisms, e.g. oxidation. Here, topstrate and substrate terminals have reversed polarities. Accordingly base pillar structure is provided of pillars 10 and electrode 14, that may be partly merged. An electrolyte layer 13 covers the base pillar structure. Intermediate current collector structure is formed of the collector 30 and electrode 12, which may be similarly partly merged, and which form a hollow pillar structure that conformally covers the base pillar structure. The intermediate current collector structure is further covered with a second electrolyte 130 and a topstrate current collector structure 20 covering the second electrolyte 130.

The term structure is here indicated to provide a combined function of current collectors and electrodes, either in conformal laminate or in a scaffolding geometry.

Layer thicknesses of the two sides of coating are adjusted in such a way that an optimal trade-off between capacity and rate performance match is reached between the two layers. Practical thicknesses of the electrode layers therefore vary between 100-3000 nm, and may be even smaller when merged within the collectors.

Figure 12:
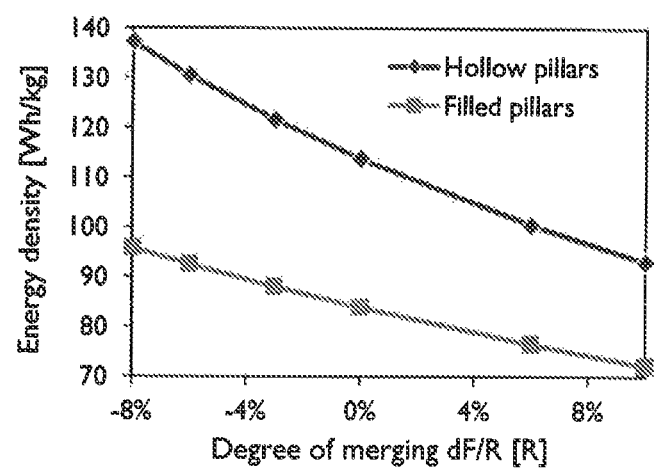
FIG. 12 shows an indicative chart illustrating the gain in energy density for various embodiments.

FIG. 12 shows indicative gains in energy density for merged and hollow pillar structures. In particular, gravimetric energy density on cell level by can be obtained by merging of the top electrode and/or by using hollow and/or porous pillar structures. The stack considered is LMNO (500 nm)-LIPON (200 nm)-TiO2 (340 nm), with pillar aspect ratio of 50 (100 um height, 2 um diameter). It is found that merging of filled pillars may lead to 13% increase in gravimetric energy density and using hollow pillars with a wall thickness of 100 nm may lead to an additional gain of 30% obtained at optimum merging.

Examples of these thin-film batteries may be provided in an automobile, e.g. fabricated on the package or cover of automobile parts that use these batteries. Accordingly the metal substrate having the high aspect ratio structure may monolithically formed as a casing structure. There are other devices that have covers made of aluminium, where this concept may be applied. Alternatively a metal substrate may be stacked on an organic foil, i.e. containing a hydrocarbon content, for example, PEN, PET etc. or plastic mould structure. Even if the packages/covers of most of the devices today are moulded of plastic, still 10 s of micrometers of aluminium can be electroless plated by ionic liquids on plastics to create the battery on it or in it.

Optionally, in order to enable easy flexing, instead of having the pillars all over the substrate foil, isolated islands of pillar-clusters be patterned in a metal foil to form an integral part of it. In an example, the high aspect ratio clusters may span an area smaller than 10e4 micrometer 2; and the planar zones may be are formed as strips having a width larger than 50 micrometer, although other ranges can be suitably used to the same effect of clustering to enable easy flexing. In order to make such batteries cost-effective, it is advantageous to transfer this technology to large area metal foils e.g. for roll-to-roll processing.

In an embodiment, the merged second electrode layer has dimensions such that

The total electrochemical capacity in the volume of the second electrode layer matches that of the first electrode layer up to a factor X, X between 0.8 and 1.2 for TiO2, LTO and graphite anodes, and between 0.5 and 3 for lithium or Silicon anodes as second electrode.

The merged second electrode layer has a non-conformal thickness defined by the degree of merging in % which is defined as $(1-sP/2*R)$, with sP the starting interpillar distance and R the sum of first electrode, electrolyte, second electrode and topstrate current collector layers. A merging between 0% and −8% is preferred.

To achieve such a tuned layer structure the following process steps can be taken:

Fabrication of a pattern of electronically conductive pillars with average height hP and diameter dP, where the interpillar distance sP is matching the amount of merging for a given average of first electrode, electrolyte, second electrode and topstrate layer thickness. A topological second electrode layer thickness is defined by capacity matching of non-merged pillar with the first electrode.

Subsequently thereto: a conformal deposition of first electrode and electrolyte layer. For example techniques such as dip-coating, electrodeposition, atomic layer deposition (ALD or sALD) are used for these layers Then: fabrication of the merged second electrode layer, for example by ALD (or sALD): based on an average growth rate specific for these high aspect ratios, the deposition time is set to match the topological thickness defined under a)

Dip-coating: Concentration of the solvent, clipping speed & number of clipping steps are set to match the topological thickness defined under Next a fabrication of the interspace structure. this can be achieved for example by Conformal deposition of a thin film (typically <100 nm) layer of conductive material onto the merged electrode e.g. by electroless deposition, ALD.

then part of the interspace structure (0-50% preferably) is filled with a conductive polymer. This can be achieved e.g. by spin coating a conductive polymer, where the viscosity of the solution is tuned to minimize capillary effect, ensuring the dried conductive polymer only covering the whole pillar structure and just partly penetrating into the interpillar spaces.

The whole pillar structure is covered with a top current collector, typically a few microns thick. Process example: sputtering of Ni, Cu or any other metal layer.

Subsequently a topstrate current collector can be provided by filling of the interspace structure with a conductive material e.g. by dip-coating of a conductive polymer (e.g. PEDOT-PSS) or electroless deposition of Ni.

the whole pillar structure can than be covered with a top current collector, typically a few microns thick, e.g. by sputtering of Ni, Cu or any other metal layer.

It will be appreciated that while specific embodiments of the invention have been described above, that the invention may be practiced otherwise than as described. In addition, isolated features discussed with reference to different figures may be combined.

The invention claimed is:

1. A lithium battery with a substrate current collector formed of electrically conductive pillars (11) on a substrate face producing elongate and aligned structures on the substrate face with upstanding pillar walls; wherein the electrically conductive pillars are provided with a first electrode layer (14), a solid state electrolyte layer (13) provided on the first electrode; and a second electrode layer (12), forming a coated pillar (110), wherein second electrode layers on adjacent coated pillars merge in an overlap region (O) so that a part of the second electrode layer is shared between adjacent coated pillars (110); and a topstrate current collector (220) comprising: an electrically conductive top layer covering the pillar structure, and electrically conductive interspace structures formed in interspace regions (S1) between the coated pillars, wherein the electrically conductive interspace structure is formed from one or more of:

a conformal layer of a conductive material with a thickness below 100 nm deposited on the second electrode layer and a conductive polymer filling the interspace regions up to 50%, and a conductive material filling the interspace regions.

2. The lithium battery according to claim 1, wherein the high-aspect ratio structure comprises electrically conductive pillars having a radius of curvature larger than 50 nanometer.

3. The lithium battery according to claim 2, wherein the electrically conductive pillars are higher than 10 micrometer.

4. The lithium battery according to claim 1, wherein the substrate is a metal foil having both faces forming a high-aspect ratio structure.

5. The lithium battery according to claim 1, having a plurality of current collectors, that are stacked in parallel or stacked in series.

6. The lithium battery according to claim 1, wherein the metal substrate is stacked on an organic foil.

\* \* \* \* \*